United States Patent
Hirasaka (10) Patent No.: US 7,831,929 B2
(45) Date of Patent: *Nov. 9, 2010

(54) METHOD, SYSTEM, AND PROGRAM PRODUCT FOR CONTROLLING A DISPLAY ON A DATA EDITING SCREEN

(75) Inventor: Yoshihiro Hirasaka, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/535,011

(22) Filed: Aug. 4, 2009

(65) Prior Publication Data

US 2009/0288038 A1    Nov. 19, 2009

Related U.S. Application Data

(63) Continuation of application No. 11/490,435, filed on Jul. 20, 2006, now Pat. No. 7,584,436.

(30) Foreign Application Priority Data

Aug. 5, 2005   (JP)   .............................. 2005-228490

(51) Int. Cl.
   *G06F 3/048*   (2006.01)
   *G09G 5/00*   (2006.01)
(52) U.S. Cl. .................. 715/811; 715/964; 345/619
(58) Field of Classification Search ................. 715/704, 715/964, 811; 345/619
   See application file for complete search history.

(56) References Cited

U.S. PATENT DOCUMENTS

| | | | | |
|---|---|---|---|---|
| 5,265,197 | A  * | 11/1993 | Kondo | ........................ 345/420 |
| 6,590,584 | B1 * | 7/2003 | Yamaura et al. | ............ 715/704 |
| 6,606,744 | B1 * | 8/2003 | Mikurak | ..................... 717/174 |
| 7,024,433 | B2 * | 4/2006 | Arai et al. | ........................ 1/1 |
| 7,136,528 | B2 * | 11/2006 | Edwards et al. | ............. 382/209 |
| 7,302,483 | B1 * | 11/2007 | Carbone et al. | ............. 709/225 |
| 7,349,578 | B2 * | 3/2008 | Edwards et al. | ............. 382/209 |
| 2002/0099461 | A1* | 7/2002 | Anami et al. | ................. 700/97 |
| 2004/0168172 | A1* | 8/2004 | Masuda | ..................... 719/310 |
| 2005/0125304 | A1* | 6/2005 | Thornton et al. | .............. 705/26 |

FOREIGN PATENT DOCUMENTS

| | | |
|---|---|---|
| JP | 1139133 | 5/1989 |
| JP | 6059844 | 3/1994 |
| JP | 6161628 | 6/1994 |
| JP | 6175799 | 6/1994 |
| JP | 9190327 | 7/1997 |
| JP | 9251370 | 9/1997 |
| JP | 2002312777 | 10/2002 |

OTHER PUBLICATIONS

Wakako Abe, Information Materials For IDS, Japanese Patent Office, Mar. 13, 2008, 1 page, Japan.

* cited by examiner

*Primary Examiner*—Tadesse Hailu
*Assistant Examiner*—Nicholas S Ulrich
(74) *Attorney, Agent, or Firm*—William Steinberg; Shimokaji & Associates

(57) ABSTRACT

The invention provides a method, system, and program product for controlling a display on a computer-aided design (CAD) data editing screen, whereby commands more likely to be utilized are preferentially displayed.

12 Claims, 10 Drawing Sheets

| PART ID | DESIGN INFORMATION | PART NAME | | APPROVAL REQUEST |
|---------|-------------------|-----------|---|------------------|
| ..... | ..... | ..... | ..... | ..... |
| 2350001 | Bracket1.model | BRACKET REVISION 1 | | — |
| 2350002 | Bracket2.model | BRACKET ALPHA VERSION | | — |
| 2360001 | Bracket3.model | BRACKET FOR TEST | | — |
| 2360001 | Bracket4.model | BRACKET FINAL VERSION | | ○ |
| ..... | ..... | ..... | ..... | ..... |
| 7250001 | SeatXXX.model | SHEET SPARE | | — |
| 7260001 | Seat V2.model | SHEET COMPLETION VERSION | | ○ |
| ..... | ..... | ..... | ..... | ..... |

(A) HISTORY FOR PLANNING PHASE

| FILE NAME | HISTORY | SIZE |
|---|---|---|
| Bracket1.mode1 | A11 → A15 → A34 → B05 → ··· | — |
| Bracket2.mode1 | A12 → A15 → A51 → C12 → ··· | — |
| ⋮ | ⋮ | ⋮ |
| Bracket4.mode1 | B32 → B11 → A12 → B05 → ··· | 12.5MB |

(B) HISTORY FOR DETAILED DESIGN PHASE

| FILE NAME | HISTORY | SIZE |
|---|---|---|
| Bracket1.mode1 | F53 → F12 → E06 → F03 → ··· | — |
| Bracket2.mode1 | F32 → F53 → F02 → E05 → ··· | — |
| ⋮ | ⋮ | ⋮ |

(C) HISTORY FOR DRAFTING PHASE

| FILE NAME | HISTORY | SIZE |
|---|---|---|
| Bracket1.mode1 | G32 → G15 → X13 → ··· | — |
| Bracket2.mode1 | G15 → X15 → G35 → ··· | — |
| ⋮ | ⋮ | ⋮ |

(D)

| USER ID | HISTORY |
|---|---|
| ⋮ | ⋮ |
| suzuki | F52 → F35 → F12 → E51 → ··· |
| tanaka | E15 → E32 → G15 → F13 → ··· |
| sato | C35 → E35 → E35 → F13 → ··· |
| ⋮ | ⋮ |

METHOD, SYSTEM, AND PROGRAM PRODUCT FOR CONTROLLING A DISPLAY ON A DATA EDITING SCREEN

CROSS-REFERENCE TO RELATED APPLICATIONS

This application claims the benefit of co-pending Japanese Patent Application No. 2005-228490, filed 5 Aug. 2005, which is hereby incorporated herein.

BACKGROUND OF THE INVENTION

1. Technical Field

The invention relates generally to the control of graphical displays, and more particularly, to a method, system, and program product for controlling a display on a computer-aided design (CAD) data editing screen, whereby commands more likely to be utilized are preferentially displayed.

2. Background Art

In recent years, computer-aided design (CAD) systems have been widely used for the mechanical design of products. A CAD system is applicable to a broad range fields from the design of ships or aircraft to the design of precision instruments. Further, CAD systems are applicable not only to the design of a finished product but also the design of its component parts. Such parts include, for example, printed circuit boards, sheet metal parts, plastic parts, etc.

Design processes of each part or the finished product vary according to the type of part or finished product. For this reason, in order to increase design efficiency, a conventional CAD system provides a user with a large number of commands suitable for various design processes. If the number of commands is large, however, it becomes difficult for the user to find commands applicable to the operation that the user wants.

In order to solve this problem, there has conventionally been proposed a technology of classifying the commands that are apt to be used simultaneously into respective command groups and displaying them together. For example, the CAD system displays, based on the designation by the user, a certain command group in a window on a screen for designing. When receiving an instruction of switching the command group, the CAD system displays another command group in the window other than the command group previously displayed. This window is called a workbench or a toolbox, and is widely used in design programs.

In conventional CAD systems, several commands are displayed on the workbench, for example. Even in designing one part, however, the several commands may be insufficient for the required tasks, and thus the user must change the display of the workbench. Moreover, as design phases proceed from the initial planning phase to the final drafting phase, the commands being used may also change. For this reason, the design operation has required a designer's skill or the design operation has been sluggish, so that there has been a case where efficiency of the design process has deteriorated.

There has also been proposed a system for aligning icons displayed on the window in order of frequency in use, or in order of access time. If such a system is applied, the icons for inputting the commands can be aligned in order of frequency in use, or in order of access time. In a CAD system, however, the commands to be used may change according to the design phase, so that the command being used immediately before the operation may not be used in future phases. Moreover, an icon being used at high frequency for a certain design object may not be used for other design objects at all.

Therefore, an object of the present invention is to provide a method, a system, and a program which can solve the aforementioned problems.

SUMMARY OF THE INVENTION

The invention provides a method, system, and program product for controlling a display on a computer-aided design (CAD) data editing screen, whereby commands more likely to be utilized are preferentially displayed.

A first aspect of the invention provides a method for controlling a display on an editing screen of a computer-aided design (CAD) system, the method comprising: recording a history of commands executed while editing component data; designating component data as intended as a new editing object; retrieving a history of commands corresponding to edited component data determined to be similar to the designated component data based on a predetermined rule; and displaying on an editing screen at least one command included in the retrieved history of commands preferentially to other commands.

A second aspect of the invention provides a system for controlling a display on an editing screen of a computer-aided design (CAD) system, the system comprising: a system for recording a history of commands executed while editing component data; a system for designating component data as intended as a new editing object; a system for retrieving a history of commands corresponding to edited component data determined to be similar to the designated component data based on a predetermined rule; and a system for displaying on an editing screen at least one command included in the retrieved history of commands preferentially to other commands.

A third aspect of the invention provides a program product stored on a computer-readable medium, which when executed, controls a display on an editing screen of a computer-aided design (CAD) program code, the program product comprising: program code for recording a history of commands executed while editing component data; program code for designating component data as intended as a new editing object; program code for retrieving a history of commands corresponding to edited component data determined to be similar to the designated component data based on a predetermined rule; and program code for displaying on an editing screen at least one command included in the retrieved history of commands preferentially to other commands.

A fourth aspect of the invention provides a method for deploying an application for controlling a display on an editing screen of a computer-aided design (CAD) system, the method comprising: providing a computer infrastructure being operable to: record a history of commands executed while editing component data; designate component data as intended as a new editing object; retrieve a history of commands corresponding to edited component data determined to be similar to the designated component data based on a predetermined rule; and display on an editing screen at least one command included in the retrieved history of commands preferentially to other commands.

A fifth aspect of the invention provides computer software embodied in a propagated signal for controlling a display on an editing screen of a computer-aided design (CAD) system, the computer software comprising instructions to cause a computer system to perform the following functions: record a history of commands executed while editing component data; designate component data as intended as a new editing object; retrieve a history of commands corresponding to edited component data determined to be similar to the designated component data based on a predetermined rule; and display on an editing screen at least one command included in the retrieved history of commands preferentially to other commands.

The illustrative aspects of the present invention are designed to solve the problems herein described and other problems not discussed, which are discoverable by a skilled artisan.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION

As indicated above, the invention provides a method, system, and program product for controlling a display on a computer-aided design (CAD) data editing screen, whereby commands more likely to be utilized are preferentially displayed.

While the present invention will be hereinafter described through preferred embodiments of the present invention, the following preferred embodiments do not limit the present invention defined in the claims, and all of the combinations of features described in the preferred embodiments are not necessary to solve problems of the invention.

Figure 1:
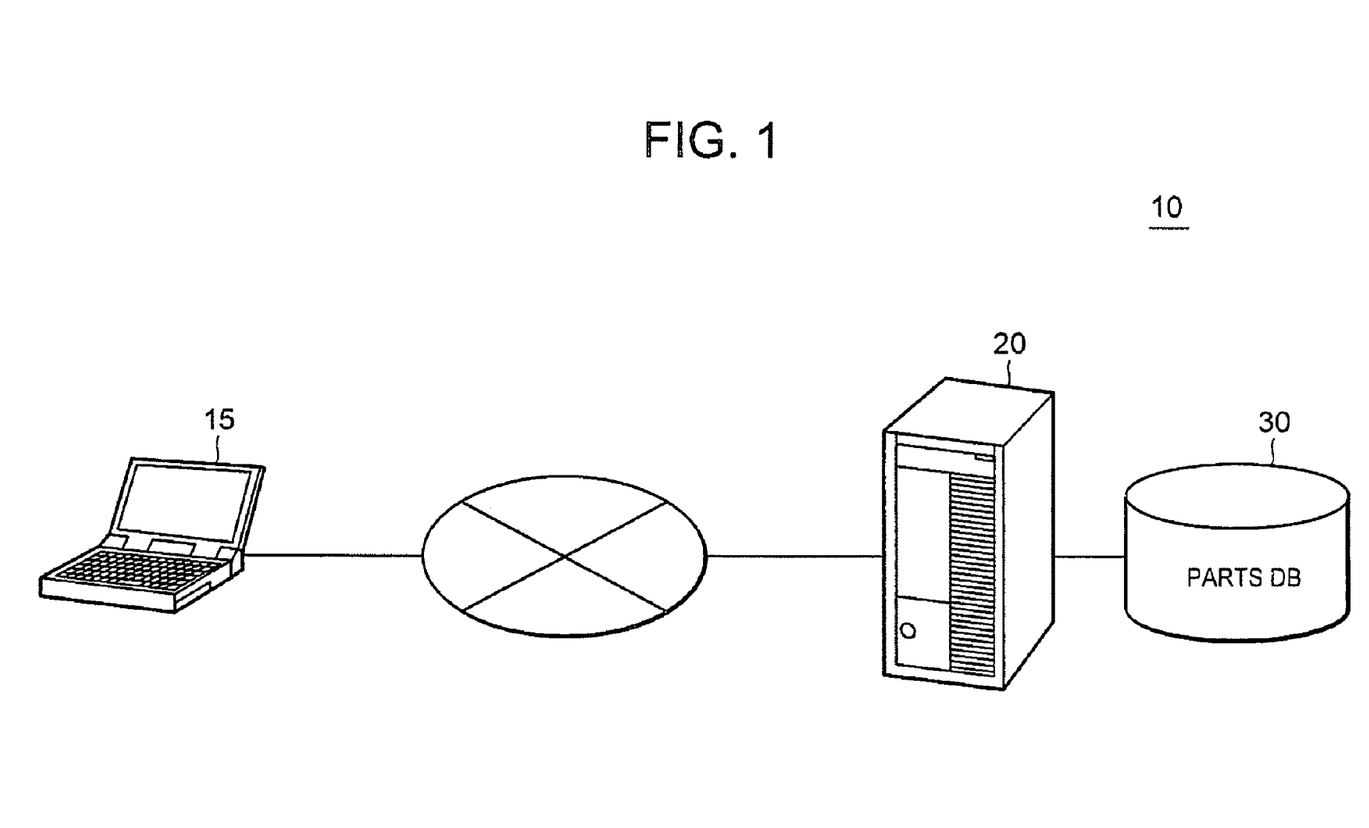
FIG. 1 schematically illustrates an entire conFIGuration of a design aid system.

FIG. 1 schematically illustrates an entire configuration of a design aid system 10. The design aid system 10 is provided with a user terminal 15, a design aid apparatus 20, and a parts DB 30. The user terminal 15 is connected to the design aid apparatus 20 via a communication line, such as a local area network or the like. The user terminal 15 then acquires design information of a part to be a design object from the design aid apparatus 20 to display it on a screen of the user terminal 15. The design aid apparatus 20 manages the parts DB 30 on which the design information of the parts are recorded. The design aid apparatus 20 then reads the design information from the parts DB 30 based on an instruction received from the user terminal 15 to transmit it to the user terminal 15.

The design aid apparatus 20 in accordance with the present embodiment aims at displaying commands suitable for a part to be designed more intelligibly than other commands, upon displaying the commands for designing the part along with the design information of the part on the user terminal 15.

Figure 2:
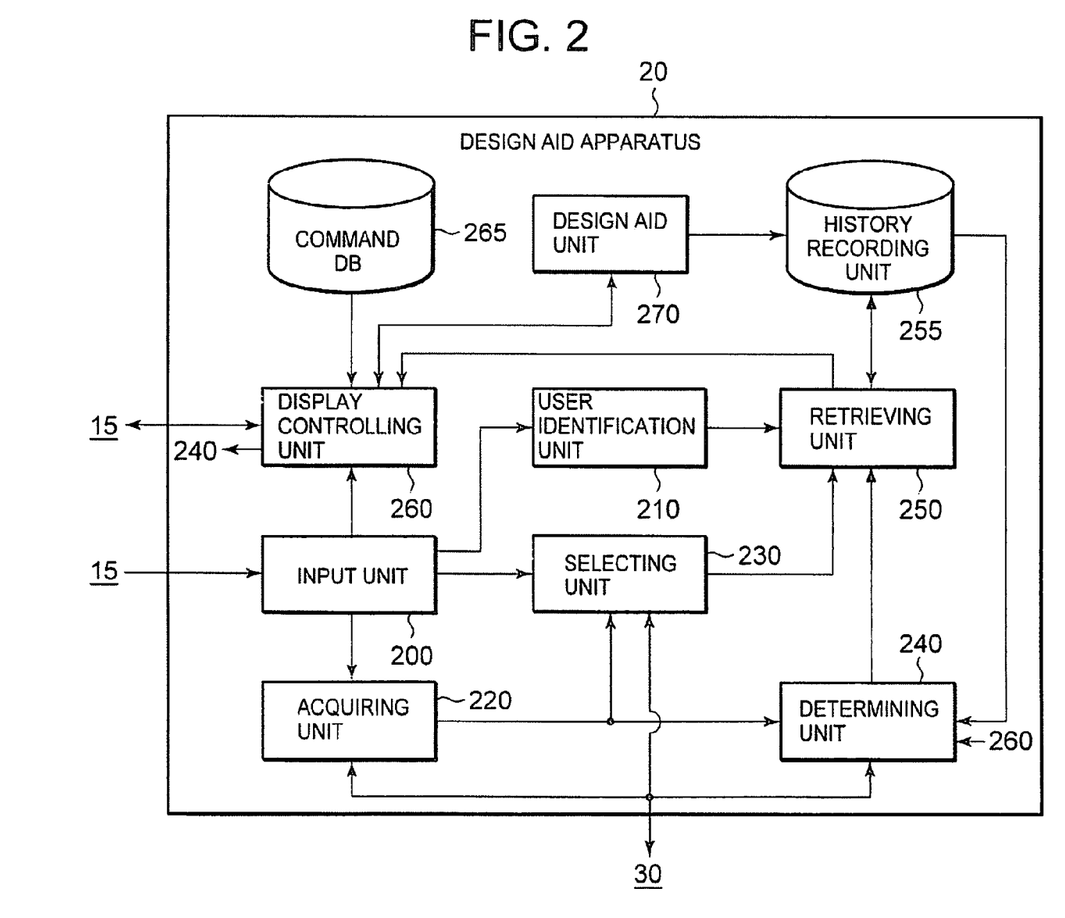
FIG. 2 illustrates a functional conFIGuration of a design aid apparatus.

FIG. 2 illustrates a configuration of the functions of the design aid apparatus 20. The design aid apparatus 20 is provided with an input unit 200, a user identification unit 210, an acquiring unit 220, a selecting unit 230, a determining unit 240, a retrieving unit 250, a history recording unit 255, a display controlling unit 260, a command DB 265, and a design aid unit 270. The input unit 200 is operable to input identification information of a user who newly edits the design information of the part (henceforth referred to as a user ID). Moreover, the input unit 200 is operable to input designation of the design information of a part to be newly edited. The designation of the design information may be a file itself which stores the design information of the part, may be a file name of that file, and may be identification information for identifying the part on the parts DB 30 (henceforth referred to as a part ID).

Meanwhile, the design information of the part is an example of a component data intended as an editing object (object to be edited). The component data in a CAD environment is a unit of edit (editing unit), and is a concept including not only the design information of the part but also the design information of a constituting component of a finished product being currently designed. The component data may include, for example, an outline of a part, a two-dimensional form of ridgelines of a part, or the like. Alternatively, data which the design aid apparatus 20 deems an editing object may be a document which can be edited with a word processor, a table and a graph which can be edited with a spreadsheet software, or image data, such as an image, a photograph, or the like. Meanwhile, a part intended as a new design object is an example of data intended as a new editing object. The data intended as the new editing object includes not only data that is newly created from a state where the data is not present at all, but also existing data. Moreover, the phrase "to edit the design information of the part" will be hereinafter referred to as "to design a part."

The user identification unit 210 identifies a user based on an inputted user ID. For example, the user identification unit 210 may authenticate the user by entering a password along with the user ID to identify the user. The acquiring unit 220 acquires an attribute of a file which stores design information intended as a new editing object. For example, the acquiring unit 220 may acquire a file name of the file as the attribute of the file. Alternatively, the acquiring unit 220 may acquire an extension of the file or information for indicating an originator of the file, as an attribute. Moreover, the acquiring unit 220 acquires a data size of the file from the file. The file used herein is an example of an editing unit in accordance with the present invention. That is, in this example, the user reads the file, which is the editing unit, to update the design information, and records an updated result on the file. The editing unit may be not only a single file but also a plurality of files, and may be a part of a file. In this case, the acquiring unit 220 may acquire a directory name including a plurality of files as an attribute of an editing unit, instead of the file name.

The selecting unit 230 selects a file having an attribute similar to the acquired attribute. For example, the selecting unit 230 may select a file having a file name similar to the acquired file name from the parts database (DB) 30. Moreover, the selecting unit 230 may select a file from a directory having a name the same as or similar to the acquired directory name. As used herein, "similar" may include "the same." That is, the selecting unit 230 may select a file having the same attribute as the acquired attribute. As another example, the selecting unit 230 may select, from the parts DB 30, a part corresponding to a part ID at least a part of which is common to the part ID inputted by the input unit 200, and select a file name that stores the design information.

The determining unit 240 determines a creation phase of the part intended as the new design object, based on the acquired data size. The creation phase means each of a plurality of phases from the start of data creation to the completion thereof. For example, the determining unit 240 determines to which phase the creation phase of the part belongs among a planning phase, a detailed design phase, and a drafting phase (drawing phase). Alternatively, the determining unit 240 may cause the input unit 200 to input a creation phase of a part by a user, and determine the inputted creation phase to be the creation phase of the part. Moreover, the determining unit 240 may determine, based on a command execution instruction which the display controlling unit 260 has received, a creation phase at which the instructed commands have been executed at the highest frequency. The execution frequency of the commands can be determined by the history recording unit 255.

The retrieving unit 250 retrieves, from the history recording unit 255, a file name selected by the selecting unit 230, and a history of commands corresponding to the creation phase determined by the determining unit 240. The history recording unit 255 records, for every design information of the edited part, the history of commands that have been executed during editing the design information, associating with each the creation phase of the part. For example, the history recording unit 255 may record, for every editing unit of the design information, the history of commands that have been executed while editing the design information.

The phrase "for every design information of the edited part," as used herein, means data subjected to an editing operation at least one time by the user whether it is completed or not. Moreover, the term "command," as used herein, means an operation of processing, adding, or deleting the data. The command may be executed by, for example, designating an icon displayed on the screen of the user terminal 15. The history recording unit 255 may further record, for every user, the history of commands that have been executed in the past in order for the user to edit the data.

The display controlling unit 260 controls the user terminal 15 so as to display the commands recorded on the command DB 265 so that the commands can be selected by the user. Specifically, the display controlling unit 260 displays one or more commands included in the history retrieved by the retrieving unit 250, on a screen for editing the data intended as the new editing object, preferentially to other commands. When the input unit 200 inputs a specific user ID, the display controlling unit 260 may display one or more predetermined commands whatever the retrieved history is.

Moreover, the display controlling unit 260 detects that any of the displayed commands has been selected by the user based on a signal received from the user terminal 15. In response to the detection, the display controlling unit 260 notifies that to the design aid unit 270. The design aid unit 270 executes the command based on the notice to send an executed result to the display controlling unit 260. In response to this, the display controlling unit 260 changes the display on the screen of the user terminal 15. Moreover, the history recording unit 255 adds the command that has been executed by the design aid unit 270 to the history.

Figure 3:
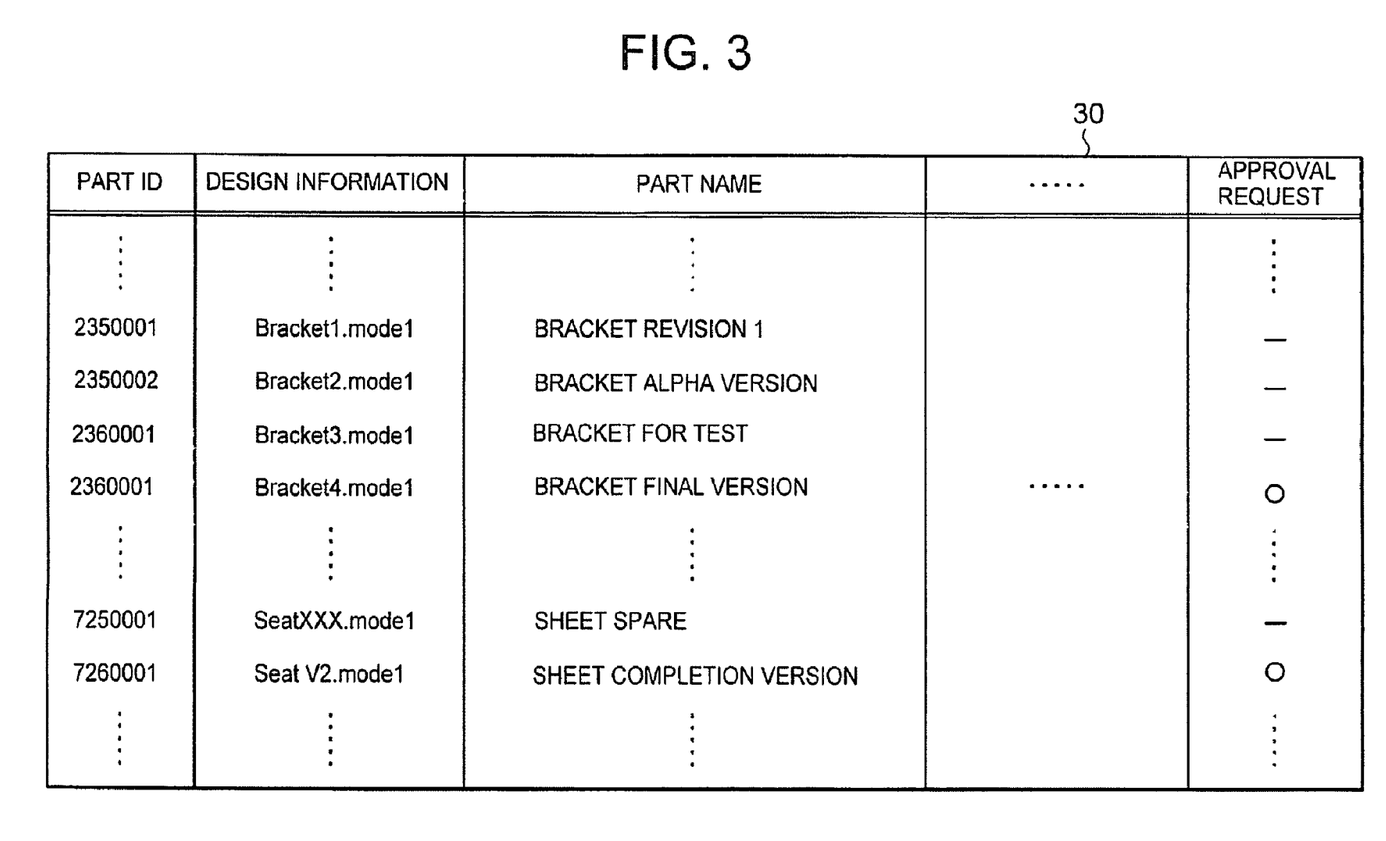
FIG. 3 illustrates an example of a data structure of a parts database.

FIG. 3 illustrates an example of a data structure of the parts DB 30. The parts DB 30 records, for every design information of the edited part, identification information allocated to the part (part ID), design information of the part, a part name of the part, and other various kinds of information. The parts DB 30 further records, for every design information of the edited part, a state indicating whether or not it is in a state where the design of the part has been completed and an approval of an administrator is being requested.

For example, the part ID of a certain part is 2350001, the design information is stored in a file called Bracket1.model, and the part name is bracket revision 1. The parts DB 30 may record various kinds of information, including a fixing position of the part, a designer in charge, a name of department for design, or the like. Moreover, the part having the part ID 2360001 is in a state where the design thereof has already been completed and approval of the administrator requested.

Figure 4:
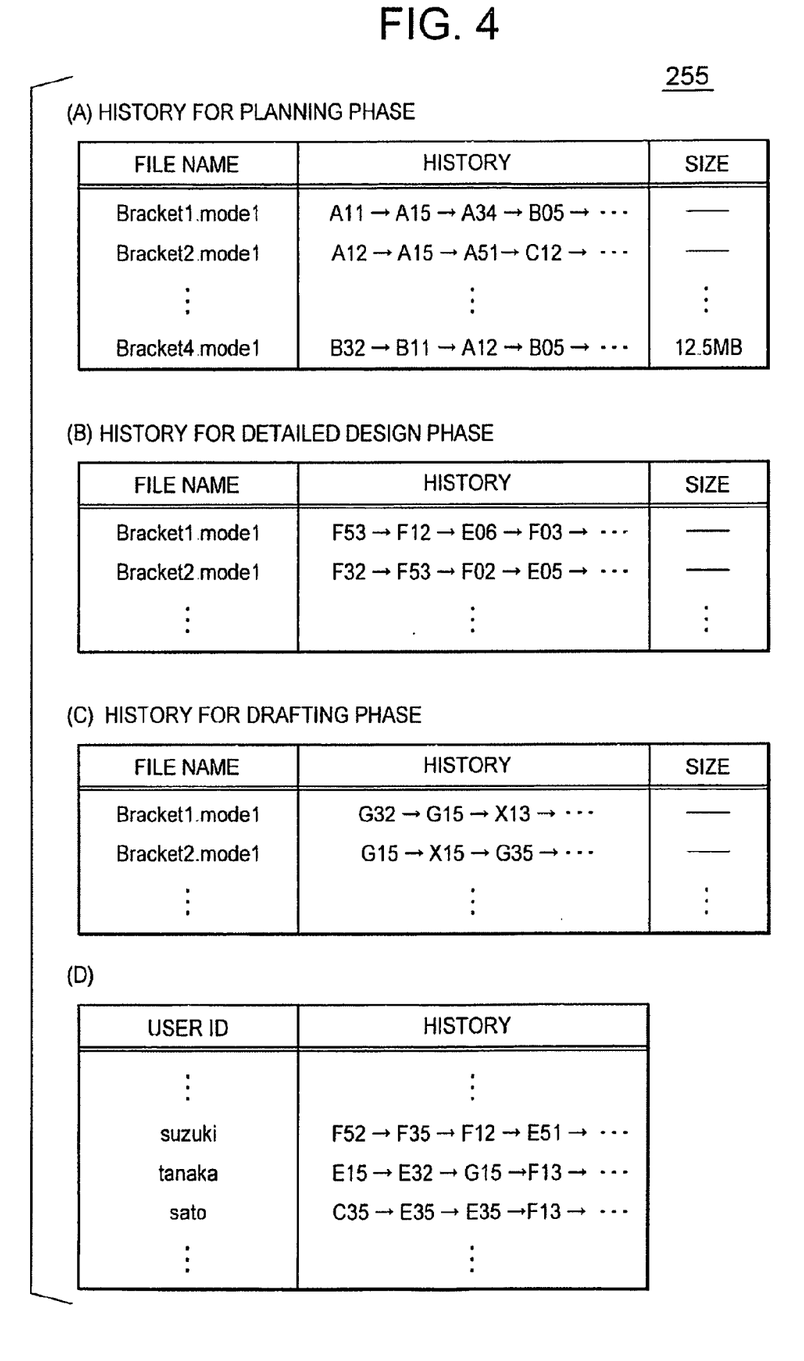
FIGS. 4A-B illustrate an example of a data structure of a history recording unit.

FIG. 4 illustrates an example of a data structure of the history recording unit 255. The history recording unit 255 records, for every design information of the edited part, associated with each of the creation phases of the part, the history of commands that have been executed during editing the design information. As shown in FIG. 4(A), the history recording unit 255 records, associated with a planning phase of the part, and for every part, the history of commands that have been executed at the planning phase of the part in order to design the part. For example, this table represents that command A11, command A15, command A34, and command B05 have been executed in this order at the planning phase of the part having the file name of Bracket1.model.

The history recording unit 255 further records, associated with the design information that has already been completed, a data size of the design information. For example, the history recording unit 255 records, associated with Bracket4.model which is a file name of a part that has already been completed, "12.5 MB" which is the data size thereof. Moreover, as shown in FIG. 4(B), the history recording unit 255 records, associated with the detailed design phase of the part, and for every part, the history of commands that have been executed at the detailed design phase of the part in order to design the part. For example, this table represents that command F53, command F12, command E06, and command F03 have been executed in this order at the detailed design phase of the part having the file name of Bracket1.model.

Moreover, as shown in FIG. 4(C), the history recording unit 255 records, associated with the drafting phase of the part, and for every part, the history of commands that have been executed at the drafting phase of the part in order to design the part. For example, this table represents that command G32, command G15, and command X13 have been executed in this order at the drafting phase of the part having the file name of Bracket1.model.

The phrase "planning phase," as used herein, means a phase of, for example, roughly designing an outline of the part in order to appropriately define a relation of interference and contact between the parts. Moreover, the phrase "detailed design phase," used herein, means a phase of determining a three-dimensional shape of the part and of defining a dimension of each portion of the part. Moreover, the phrase "drafting phase," as used herein, means a phase of creating a projection view from the determined three-dimensional shape, and of shaping it so as to be available in a manufacturing process. Since operations thereof greatly change according to the phases, the commands to be executed are also different.

Moreover, in the present embodiment, the history recording unit 255 adds and records, whenever a command is executed by any of the users, the command executed and the history on which the command has been executed. Alternatively, the history of the executed command may be recorded on the file which stores the design information. Namely, in this case, whenever a file name is inputted by the input unit 200, the history recording unit 255 may acquire the history that is recorded on the file having that file name, from the file to thereby record it thereon.

As shown in FIG. 4(D), the history recording unit 255 may further record, for every user, the history of commands that have been executed in the past, in order, for each user. For example, this table represents that a user having a user ID of suzuki has executed command F52, command F35, command F12, and command E51 in this order.

As mentioned above, while the functional configuration of the design aid apparatus 20 in accordance with the present embodiment has been described, at least a part of these functions may be provided not in the design aid apparatus 20 but in the user terminal 15. Even when such a configuration may be employed, it is possible to intelligibly display the command to the user to thereby increase its convenience in a manner similar to the configuration of the present embodiment.

Figure 5:
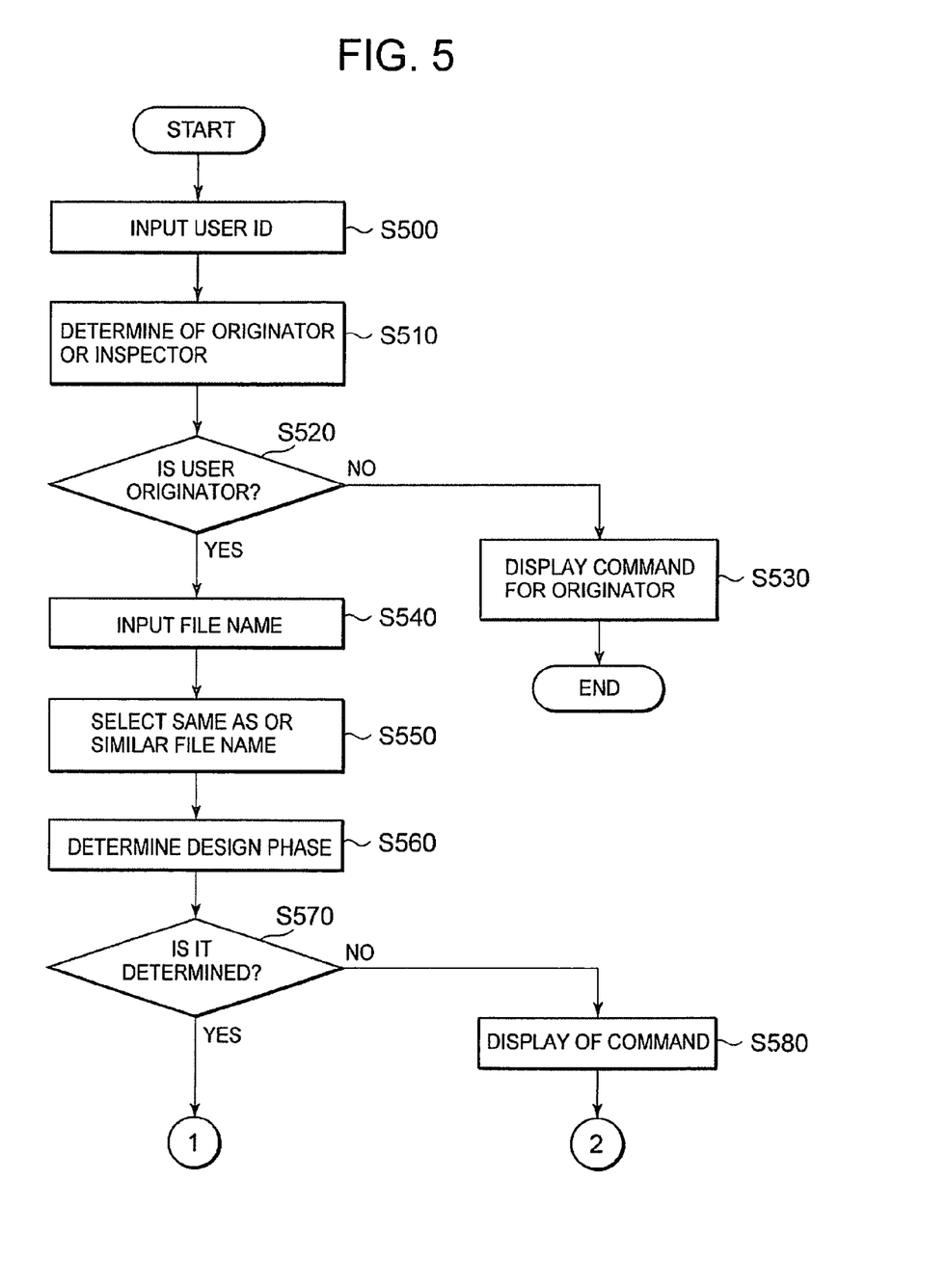
FIG. 5 illustrates a process flow where the designaid apparatus causing a workbench to display a command.

FIG. 5 illustrates a process flow where the design aid apparatus 20 causes a workbench to display commands. The input unit 200 inputs the identification information (user ID) of the user who newly edits the design information of the part, and the user identification unit 210 identifies the user (S500). The display controlling unit 260 determines whether the user is an inspector (reviewer) who merely inspects or reviews the design information without editing it, or is an originator (designer) who creates the design information, based on the user ID, for example (S510).

In the case that the user is not the originator (i.e., No at S520), the display controlling unit 260 displays commands for inspecting the design information without changing the design information of the part, preferentially to other commands (S530). Whether the user is the inspector or the originator may be defined in advance based on the user ID. For example, the user ID of the user in an administrative post of approving a completed part to be transferred into a manufacturing process may be recorded in advance on a DB which is not shown, as an inspector. Alternatively, in the case that the part intended as the new design object is in a state where the design of the part has been completed and the approval of the administrator is being requested, the display controlling unit 260 may display the command for inspecting the design information, preferentially to other commands. This condition can be determined by referring to a column of the approval request of the parts DB 30.

In the case that the user is the originator (i.e., Yes at S520), the input unit 200 inputs the file name of the file which stores the design information intended as the new editing object from the user, and the acquiring unit 220 acquires the inputted file name (S540). The selecting unit 230 selects a file having a file name similar to the acquired file name (S550). For example, if the acquired file name is BracketV2.model, Bracket1.model, Bracket2.model, Bracket3.model, and Bracket4.model, all including Bracket, may be selected.

Next, the acquiring unit 220 acquires the data size of the file, and the determining unit 240 determines the creation phase of the part based on the data size (S560). For example, the determining unit 240 determines the creation phase of the part intended as the new editing object based on a ratio of the acquired data size to the data size of the design information of the part which has already been completed. For example, when the design information of the part that has been already completed is 12.5 MB, and the design information of the part intended as the new design object is 2 MB, whereby since the ratio results in 20% or less, the determining unit 240 may determine that it is the planning phase.

Alternatively, the acquiring unit 220 may further acquire, from the file which stores the design information intended as the new editing object, a history in which the data size of the file has been changed by editing the design information. In this case, the determining unit 240 may determine the creation phase based on the history of the change of the data size which the acquiring unit 220 has acquired. Namely, for example, if an increased rate of the data size for a recent week is equal to or less than one third of that for a previous one week, the determining unit 240 may determine the creation phase to be at the detailed design phase, considering that the design of the part has approached completion. As further another example, the determining unit 240 may cause the input unit 200 to input the creation phase from the user to thereby determine the inputted creation phase to be the creation phase of the part.

Figure 6:
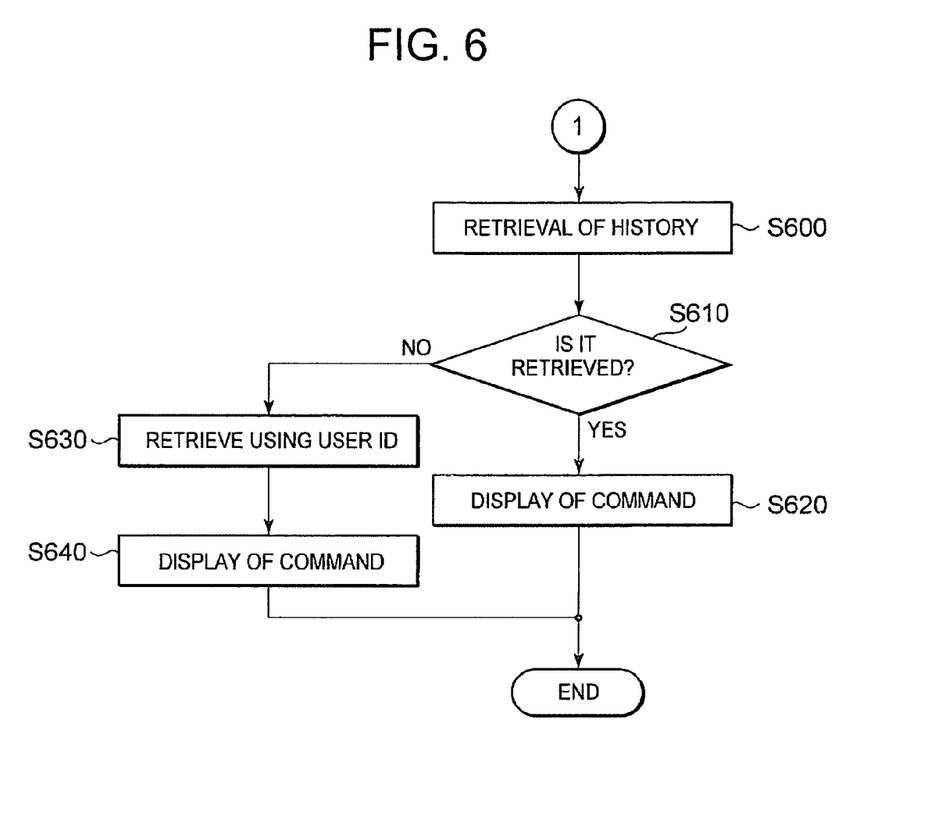
FIG. 6 illustrates a process flow continuing from that of FIG. 5.

If the creation phase has been determined (i.e., Yes at S570), the design aid apparatus 20 transfers to the process shown in FIG. 6. Meanwhile, if the creation phase of the part intended as the new design object cannot be determined based on the data size (i.e., No at S570), the display controlling unit 260 displays the command corresponding to each of a plurality of creation phases (S580), and moves to the process shown in FIG. 7.

FIG. 6 illustrates a process flow continuing from that of FIG. 5. The retrieving unit 250 retrieves, from the history recording unit 255, a file name selected by the selecting unit 230, and a history of commands corresponding to the creation phase determined by the determining unit 240 (S600). If the retrieval is successful (i.e., Yes at S610), the display controlling unit 260 displays one or more commands included in the history on a screen for editing the design information intended as the new editing object, preferentially to other commands (S620).

If the retrieval of the history is not successful (i.e., No at S610), a history corresponding to the user identified by the user identification unit 210 is retrieved from the history recording unit 255 (S630). This can be retrieved from, for example, the data shown in FIG. 4(D). Subsequently, in response to the retrieving unit 250 having retrieved the history corresponding to the user, the display controlling unit 260 displays a command included in the history, preferentially to other commands (S640).

Figure 7:
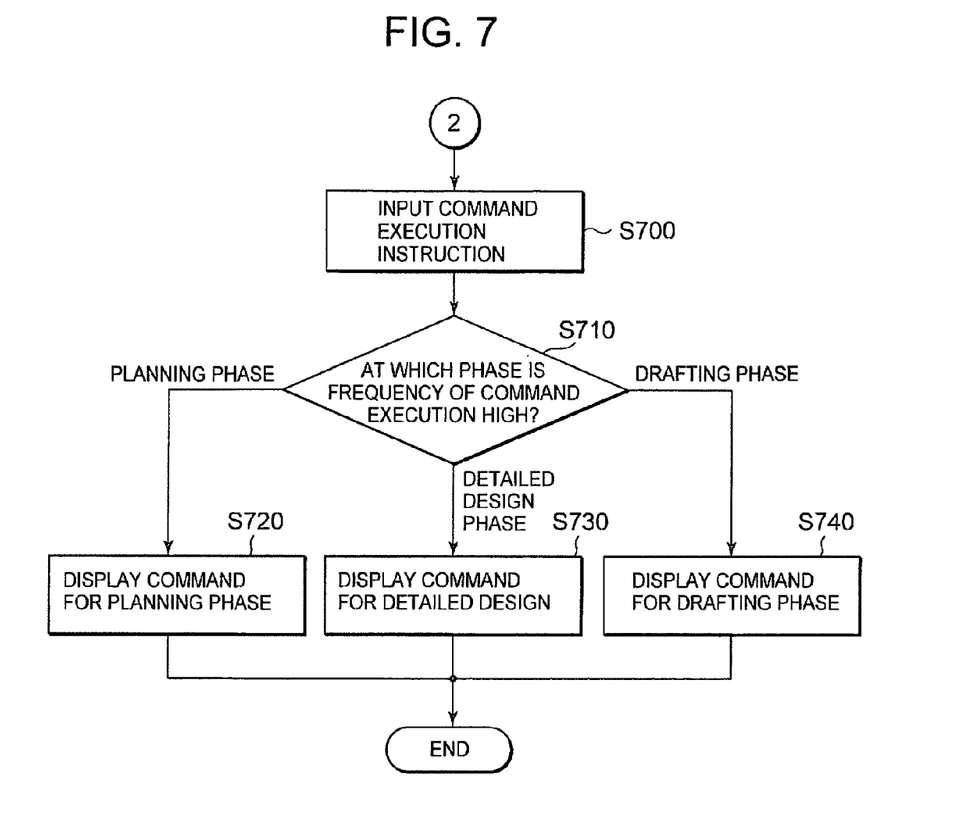
FIG. 7 illustrates a process flow continuing from that of FIG. 5.

FIG. 7 illustrates a process flow continuing from that of FIG. 5. The display controlling unit 260 inputs the command execution instruction for the command corresponding to each of the creation phases (S700). The selecting unit 230 determines at which creation phase the frequency of the command instructed to be executed is the highest in the past based on the history recording unit 255 (S710). In the case that the frequency at the planning phase is the highest (i.e., planning phase at S710), the display controlling unit 260 displays predetermined commands for use in the planning phase (S720). In the case that the frequency at the detailed design phase is the highest (i.e., detailed design phase at S710), the display controlling unit 260 displays predetermined commands for use in the detailed design phase (S730). Finally, in the case that the frequency at the drafting phase is the highest (i.e., drafting phase at S710), the display controlling unit 260 displays predetermined commands for use in the drafting phase (S740).

Figure 8:
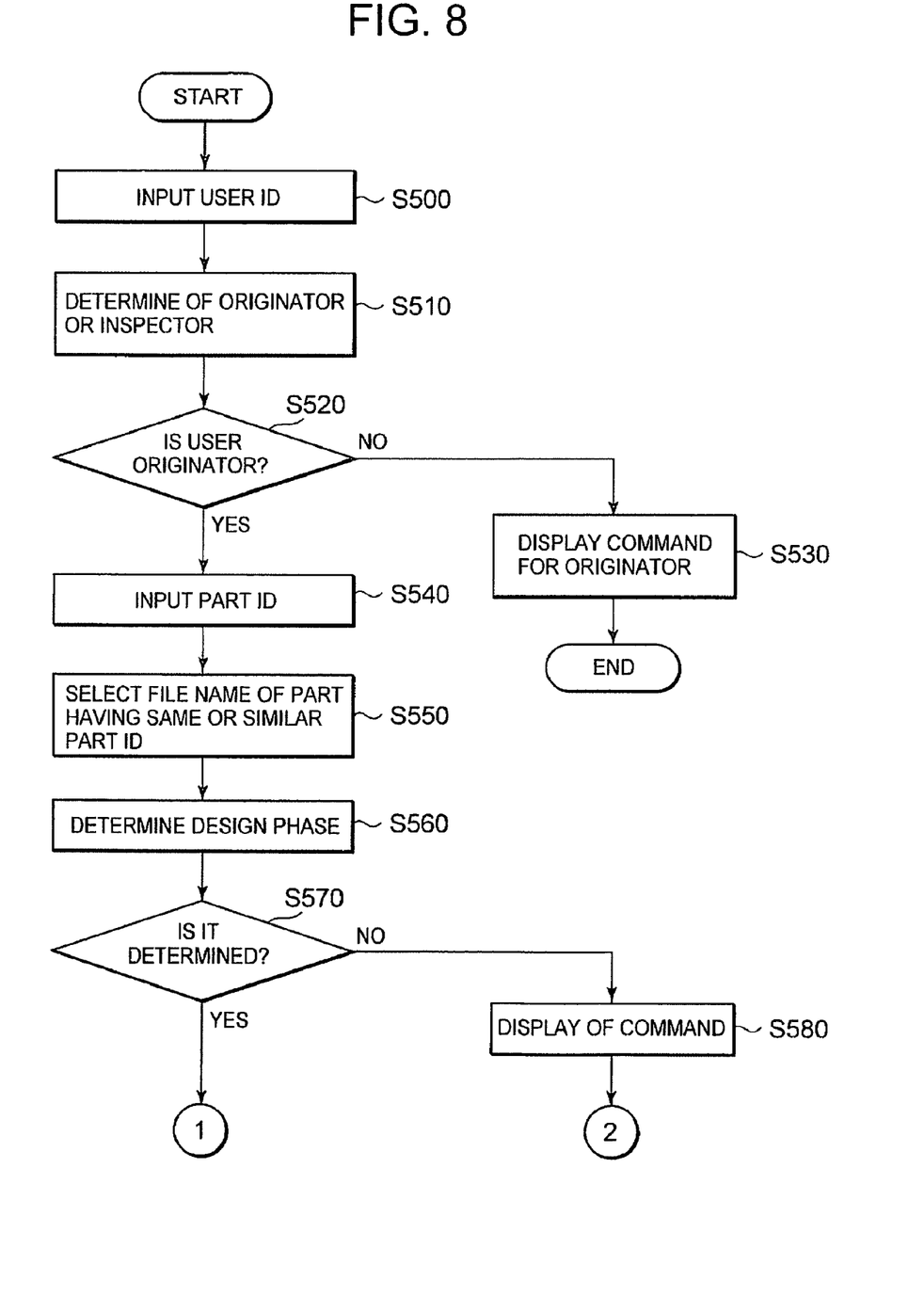
FIG. 8 illustrates a process flow in a modification thereof.

FIG. 8 illustrates a process flow according to an alternative embodiment of the invention. In this embodiment, the design aid apparatus 20 inputs not the file name of the file which stores the part, but the part ID. Specifically, the input unit 200 inputs the part ID as the designation of the part intended as the new design object (S540). Subsequently, the selecting unit 230 selects, from the parts DB 30, a part having a part ID similar to that part ID resulting from a comparison of both part IDs, and selects a file name of the file which stores the design information of the part (S550). Since other processes are approximately the same as those shown in FIGS. 5 through 7, description thereof will be omitted.

Note herein that, the part ID is a numeric value as shown in, for example FIG. 3. The numeric value then includes a numeric value for representing a type of the part in a specific digit under a predetermined rule. Specifically, numeric values 23 of top two digits represent a part regarding the Bracket. In other words, according to this rule, it is defined in advance that the parts whose numeric values of top two digits are 23 are mutually similar. As a result, the retrieving unit 250 can specify a part defined to be similar to the designated part according to the predetermined rule to thereby retrieve the history of commands corresponding to the part.

Figure 9:
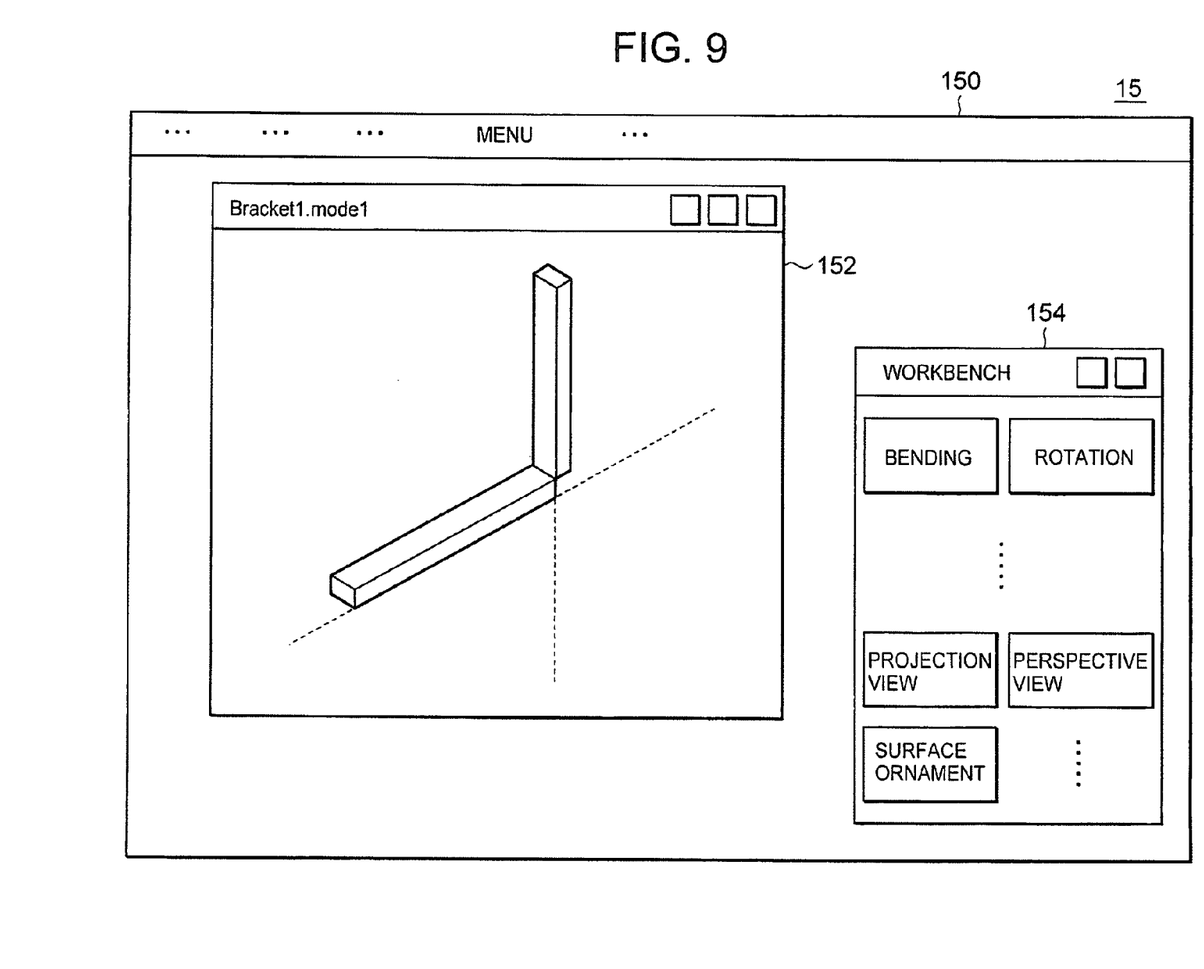
FIG. 9 illustrates a display example on a screen of a user terminal.

FIG. 9 illustrates a display example on the screen of the user terminal 15. The user terminal 15 displays a design screen 150 for designing the part. The design screen 150 is a screen for editing the design information of the part, and is an example of an editing screen for editing the data. Alternatively, the editing screen may be a screen for inputting, changing, or deleting a text, or may be a screen for creating or editing an image.

The design screen 150 includes a design information view 152 for displaying the part intended as the design object, and a workbench 154 for arranging and displaying the commands. The command may be displayed as an icon which can be pointed out with a pointing device. The display controlling unit 260 displays a command in the workbench 154 to thereby display the command, preferentially to other commands. In other words, the command displayed in the workbench 154 is intuitively displayed for the user, allowing it to be easily selected. Other commands are displayed in a pull-down menu by selecting a "menu" icon provided at the central left in the top of the design screen 150.

Moreover, in the case that the number of commands included in the retrieved history is too large to be displayed in the workbench 154, the display controlling unit 260 may display the commands in the workbench 154 in decreasing order of the frequency, and may display some commands in the aforementioned pull-down menu. Further, the display controlling unit 260 may display the command that has been retrieved more frequently on the upper part, or may display the command that has been retrieved more frequently as a larger icon.

As shown in the foregoing embodiment and modification, according to the design aid apparatus 20, upon editing the data in the CAD system, a command suitable for the type of the data and the creation phase of the part can be displayed, preferentially to other commands. As a result, the working efficiency of the originator of the data can be improved.

Figure 10:
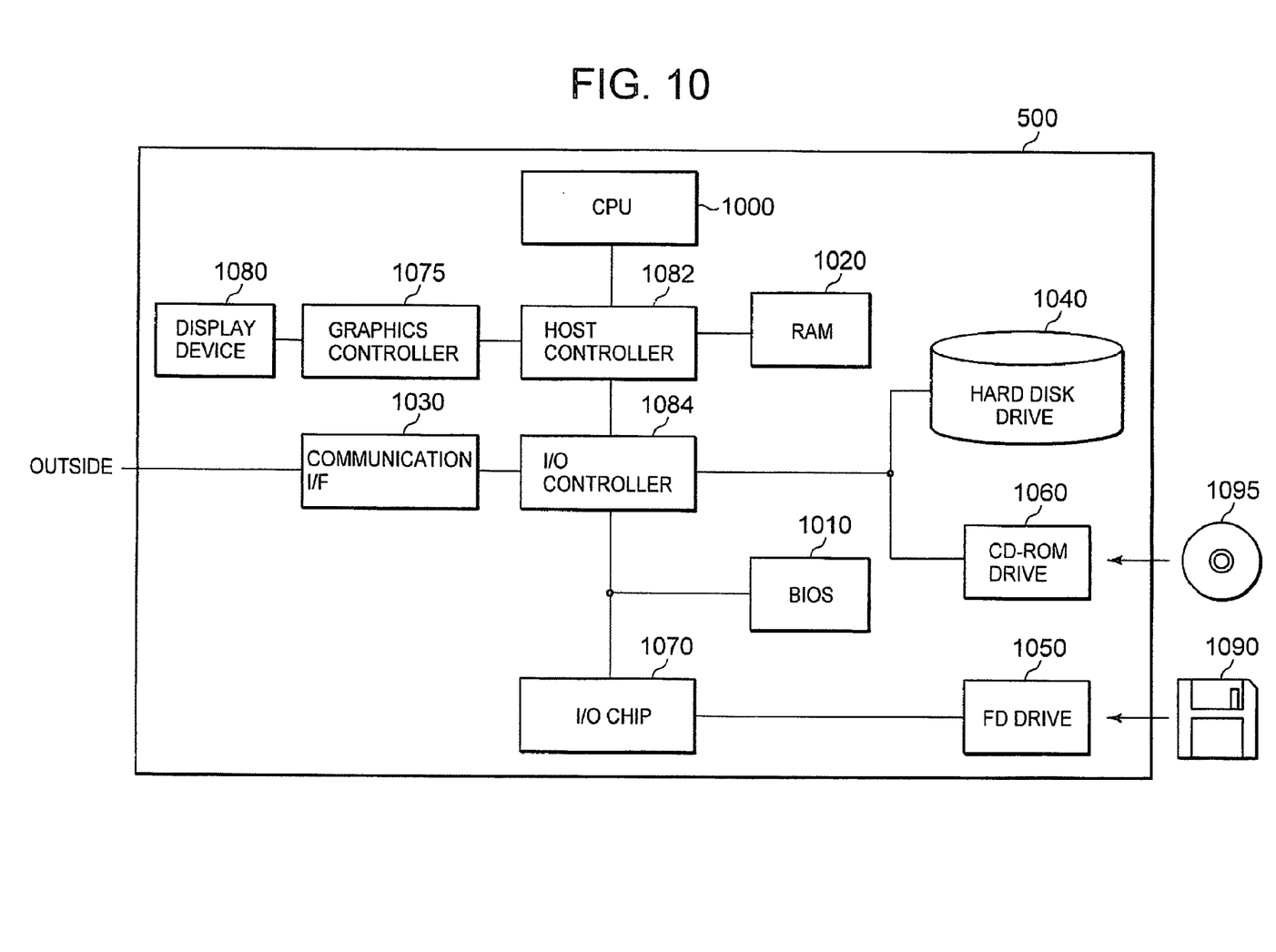
FIG. 10 illustrates an example of a hardware conFIGuration of an information-processing apparatus serving as the design aid apparatus.

FIG. 10 illustrates an example of a hardware configuration of an information-processing apparatus 500 functioning as the design aid apparatus 20. The information-processing apparatus 500 is provided with a CPU peripheral section having a CPU 1000, a RAM 1020, and a graphics controller 1075, which are mutually connected by a host controller 1082, an input/output section having a communication interface 1030, a hard disk drive 1040, and a CD-ROM drive 1060, which are connected with the host controller 1082 through an I/O controller 1084, and a legacy I/O section having a BIOS 1010, a flexible disk drive 1050, and an I/O chip 1070, which are connected with the I/O controller 1084.

The host controller 1082 connects the RAM 1020 with the CPU 1000 which accesses the RAM 1020 with a high transfer rate, and the graphics controller 1075. The CPU 1000 operates based on a program stored in the BIOS 1010 and the RAM 1020, and controls each section. The graphics controller 1075 acquires image data for the CPU 1000 or the like to generate on a frame buffer provided in the RAM 1020, and displays it on the display unit 1080. Alternatively, the graphics controller 1075 may also include thereinside the frame buffer for storing the image data generated by the CPU 1000 or the like.

The I/O controller 1084 connects the host controller 1082 with the communication interface 1030 which is a comparatively high speed I/O device, the hard disk drive 1040, and the CD-ROM drive 1060. The communication interface 1030 communicates with an external apparatus via a network. The hard disk drive 1040 stores a program product and data which the information-processing apparatus 500 uses. For example, the hard disk drive 1040 may serve as the history recording unit 255 and the command DB 265 shown in FIG. 2. The CD-ROM drive 1060 reads a program or data from a CD-ROM 1095, and provides it to the RAM 1020 or the hard disk drive 1040.

Meanwhile, the BIOS 1010, and comparatively low speed I/O devices, such as the flexible disk drive 1050 and the I/O chip 1070, are connected to the I/O controller 1084. The BIOS 1010 stores a boot program which the CPU 1000 executes at the time of booting the information-processing apparatus 500, a program depending on the hardware of the information-processing apparatus 500, or the like. The flexible disk drive 1050 reads a program or data from flexible disk 1090, and provides it to the RAM 1020 or the hard disk drive 1040 via the I/O chip 1070. The I/O chip 1070 connects the flexible disk 1090 with various kinds of I/O devices via, for example a parallel port, a serial port, a keyboard port, a mouse port, or the like.

The program provided in the information-processing apparatus 500 is stored in recording media, such as the flexible disk 1090, the CD-ROM 1095, or an IC card, and is provided by the user. The program is read from a recording medium via the I/O chip 1070 and/or the I/O controller 1084, and is installed in the information-processing apparatus 500 to be executed. Since the operation that the program causes the information-processing apparatus 500 to execute is the same as that in the design aid apparatus 20 described in FIG. 1 through FIG. 9, description thereof will be omitted.

The program described above may be stored in an external storage medium. As the storage medium, other than the flexible disk 1090, and the CD-ROM 1095, an optical recording medium such as DVD, PD, or the like, a magneto optic recording medium such as MD or the like, a tape medium, a semiconductor memory such as an IC card, or the like may be used. Moreover, the memory apparatus such as a hard disk, a RAM, or the like provided in a server system connected to a private telecommunication network or the Internet may be used as the recording medium, and the program product may be provided to the information-processing apparatus 500 via the network.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A system for controlling a display on an editing screen of a computer-aided design (CAD) system, comprising:
    a history recording unit for recording a history of commands executed while editing component data in a plurality of creation phases, in association with each of the creation phases from the creation start of the component data to the completion of edited component data;
    an input unit for entering a designation of component data as a new editing object;
    an acquiring unit for acquiring a data size of an editing unit from editing units of the designated component data;
    a determination unit for determining one of the creation phases of the designated component data based on the acquired data size;
    a retrieving unit for retrieving the history of commands corresponding to the determined creation phase from the history recording unit; and
    a display control unit for displaying on the editing screen of component data as the new editing object, at least one command included in the retrieved history of commands preferentially to other commands.

2. The system according to claim 1, further comprising:
    a component database for recording identification information allocated to component data, for the edited component data; and
    a selecting unit for selecting component data corresponding to identification information whose portion is at least in common with the designated component data from the component database, wherein
    the retrieving unit for retrieving retrieves the history of commands corresponding to the selected component data from the history recording unit; and
    the display control unit displays a command contained in the retrieved history preferentially to other commands.

3. The system according to claim 1, wherein
    the history recording unit further records data size of component data in association with already-completed component data; and
    the determination unit determines the creation phase of data as the new editing object based on a ratio of the acquired data size to the data size recorded in the history recording unit.

4. The system according to claim 1, wherein
    the acquiring unit further acquires a history for the data size of an editing unit according to the editing of component data from editing units of component data as the new editing object, and
    the determination unit determines one of the creation phases based on a history of change in the data size acquired by the acquiring unit.

5. The system according to claim 1, wherein
    the display control unit displays commands corresponding to a plurality of creation phases, respectively, on condition that the creation phase of the component data as the new editing object depends upon the acquired data size; and
    the determination unit determines the creation phase of the component data based upon the command selected by a user among the commands displayed by the display control unit.

6. A system for controlling a display on an editing screen of a computer-aided design (CAD) system, comprising:
    a history recording unit for recording a history of commands executed while editing component data;
    an input unit for entering a designation of component data as a new editing object;
    a retrieving unit for retrieving the history of commands corresponding to component data, which is defined as similar to the designated component data in accordance with a predetermined rule from the history recording unit;
    a display control unit for displaying one of the commands included in the retrieved history of commands on an editing screen of component data as the new editing object, preferentially to other commands; and
    a component database for recording a state about whether or not the component data is completed and an approval from an administrator is requested for the component data, wherein
    the display control unit displays one of the commands for browsing component data without changing the component data on condition that the component data as the new editing object is in the state where the component data is completed and an approval from an administration is requested, preferentially to other commands.

7. A system for controlling a display on a screen for data editing, comprising:
    a history recording unit for recording a history of commands executed while editing component data in a plurality of creation phases, in association with each of the creation phases from the creation start of the component data to the completion;
    an acquiring unit for acquiring data size of an editing unit from files storing data as a new editing object;
    a determination unit for determining one of the creation phases of the data as the new editing object based on the acquired data size;
    a retrieving unit for retrieving the history of commands corresponding to the determined creation phase from the history recording unit; and
    a display control unit for displaying one of the commands included in the retrieved history, preferentially to other commands.

8. The system according to claim 7, wherein
    the history recording unit further records the history of commands executed while editing the data of every data editing unit;
    the acquiring unit acquires an attribute of the data editing unit as the new editing object;
    the system further comprises a selecting unit for selecting the editing unit of data having an attribute similar to the acquired attribute;
    the retrieving unit retrieves the history of commands corresponding to the editing unit of the selected data from the history recording unit; and
    the display control unit displays one of the commands included in the retrieved history on an editing screen of the editing unit of the data as the new editing object, preferentially to other commands.

9. The system according to claim 8, wherein
    the acquiring unit acquires a file name of a file storing data as new editing object;
    the selecting unit selects a file of the file name similar to the acquired file name; and
    the retrieving unit retrieves a history of commands corresponding to the selected file from the history recording unit.

10. The system according to claim 8, wherein
    the history recording unit further records the history of commands executed in the past for editing data by users for each user;

the system further comprises a user identification unit for identifying users for newly editing data;

the retrieving unit retrieves a history corresponding to users identified by the user identification unit from the history recording unit on condition that files having an attribute similar to data as the new editing object cannot be selected; and the display control unit displays commands contained in the history according to retrieval of the history corresponding to one of the users by the retrieving unit, preferentially to other commands.

11. A program stored on a non-transitory computer readable storage medium causing an information processing apparatus to function as a system for controlling a display on an editing screen of a computer-aided design (CAD) system using an information processing apparatus, causing the information processing apparatus to function as:

a history recording unit for recording a history of commands executed while editing component data in a plurality of creation phases, in association with each of the creation phases from a creation start of the component data to a completion of the component data;

an input unit for entering a designation of the component data as a new editing object;

an acquiring unit for acquiring data size of an editing unit from editing units of the designated component data;

a determination unit for determining a creation phase of the designated component data based on the acquired data size;

a retrieving unit for retrieving the history of commands corresponding to the determined creation phase from the history recording unit; and a display control unit for displaying on the editing screen of component data as the new editing object, at least one command included in the retrieved history of commands preferentially to other commands.

12. A program stored on a non-transitory computer readable storage medium causing an information processing apparatus to function as a system for controlling a display on a screen for editing data using an information processing apparatus, causing the information processing apparatus to function as:

a history recording unit for recording a history of commands executed in a creation phase in association with each of a plurality of creation phases from a start of data creation to completion;

an acquiring unit for acquiring data size of an editing unit from editing units of designated component data;

a determination unit for determining the creation phase of the data as a new editing object, based upon the acquired data size;

a retrieving unit for retrieving the history of commands corresponding to the determined creation phase from the history recording unit; and a display control unit for displaying the commands contained in the retrieved history, preferentially to other commands.

* * * * *